Sept. 28, 1937.  P. L. MARDIS ET AL  2,094,364
PEDAL OPERATED CONTROLLER FOR ELECTRICALLY PROPELLED VEHICLES
Filed Feb. 27, 1936   2 Sheets-Sheet 1
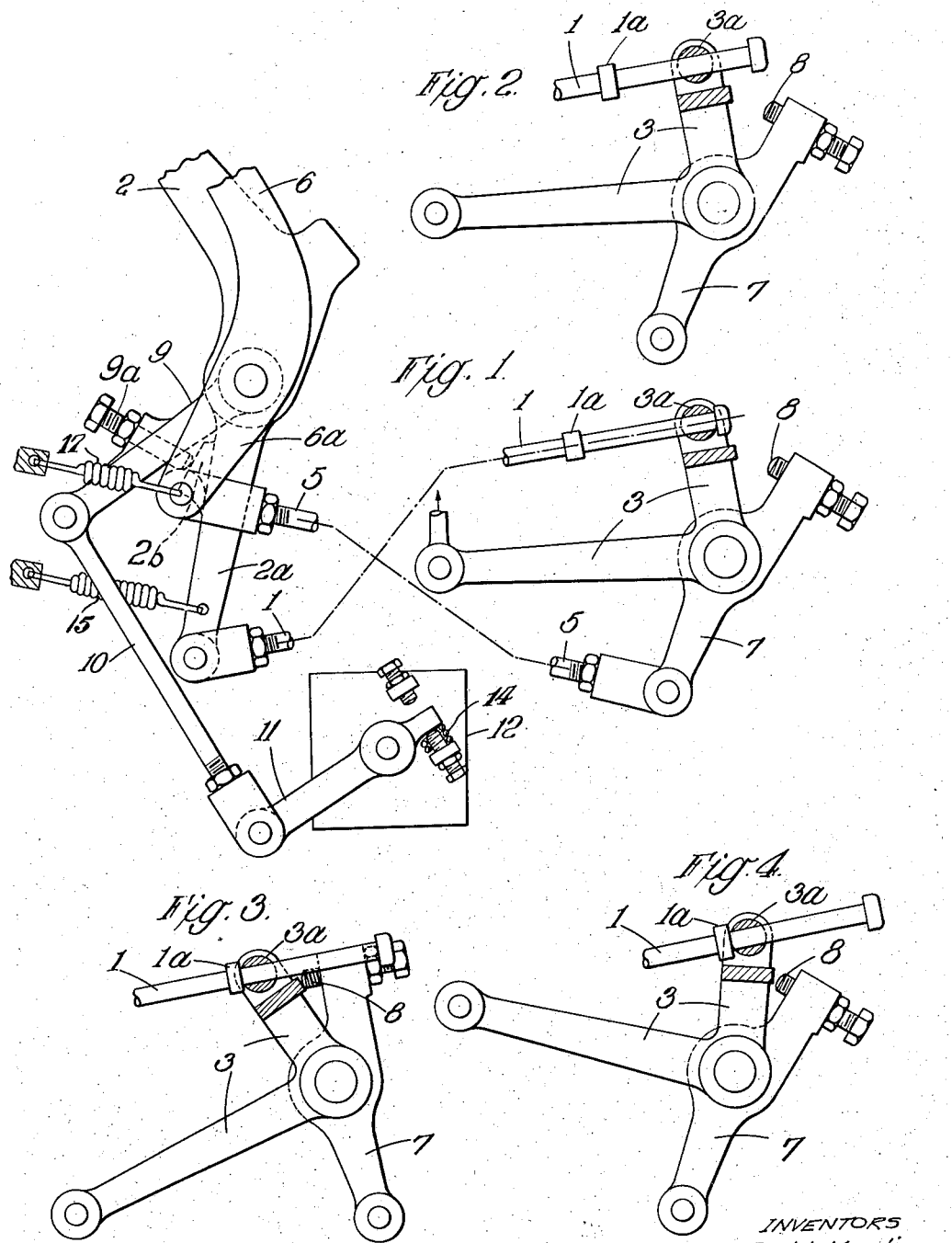

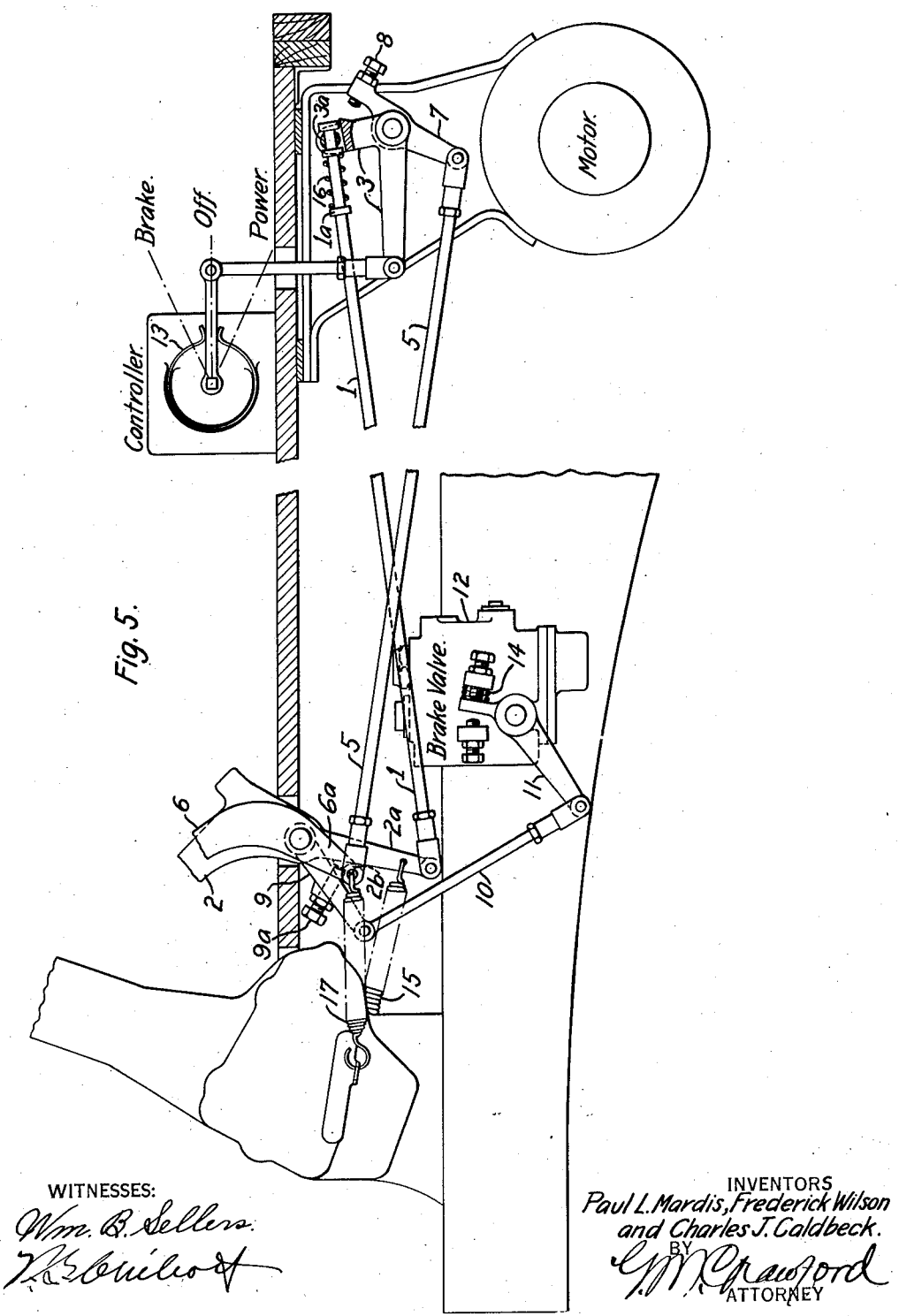

Patented Sept. 28, 1937

2,094,364

UNITED STATES PATENT OFFICE 2,094,364

PEDAL OPERATED CONTROLLER FOR ELECTRICALLY PROPELLED VEHICLES

Paul Lester Mardis, Frederick Wilson, and Charles James Caldbeck, Bradford, England, assignors to The English Electric Company Limited, London, England, a British company Application February 27, 1936, Serial No. 66,044
In Great Britain March 12, 1935

8 Claims. (Cl. 192—2)

This invention relates to pedal operated controllers for electric vehicles and comprises means whereby a controller which is biased to an "off" position may be moved to one side of that position by a "power" pedal and to the other side for controlling rheostatic braking by the pedal which controls the mechanically or fluid operated brakes. According to the invention the power pedal is adapted to drive the controller through a connection having initial lost motion which permits the controller to be moved through all its braking positions while the power pedal is in the off position, and the brake pedal is likewise adapted to drive the controller through a lost motion or yielding connection which permits the mechanically or fluid operated brakes to be applied without moving the controller to the rheostatic braking position. After the initial lost motion has been taken up, the connection between the power pedal and the controller is substantially rigid and this, in conjunction with the lost motion or yielding connection between the controller and the brake pedal, permits the brake pedal to be depressed to at least sufficient extent to apply the mechanical or fluid brakes even although the power pedal be depressed sufficiently to hold the controller in the off position or even in a power position. In the simplest form of the invention the full depression of the brake pedal with the power pedal released brings the mechanical or fluid brakes into operation before the motor is rheostatically braked and it is not possible to apply rheostatic braking without the other brakes. It is possible, however, to modify the arrangement if desired so that depression of the brake pedal brings about rheostatic braking before applying mechanical or fluid brakes which will not be applied if the pedal be only partially depressed.

One particular method of carrying out the invention in the simplest form mentioned above is illustrated by the accompanying drawings Figs. 1–4 of which Fig. 1 diagrammatically shows the complete arrangement of pedals and controller and air brake operating levers, while Figs. 2, 3, and 4 are diagrams showing the controller operating levers in various operating positions.

Fig. 5 diagrammatically shows a modified form of the invention.

In Fig. 1, in which both pedals are shown in the off position, the brake pedal is adapted to drive a controller operating lever after considerable lost motion. To this end, an adjustable rod 1 pivotally connected to an extension 2a from the brake pedal 2 and so adapted to be pushed by depressing the said pedal, is arranged to slide freely through the pivot pin 3a carried by one arm of the bell crank lever 3 of which the other arm is connected by an operating link to the controller. The latter is biased in the usual manner to the off position by a spring 13 shown in Fig. 5, which will not tend to rotate the controller beyond the off position if it be suddenly released from either a power or rheostatic brake position.

The power pedal is likewise adapted to drive the controller in the reverse direction with lost motion. To this end, a second push rod 5 is pivotally connected to both an extension 6a from the power pedal 6 and a driving lever 7 which must be adjacent to and which is shown as co-axial with the controller operating lever 3. An adjustable abutment on this second lever which is shown in the simple form of a set screw 8 with lock nut, is adapted, after a certain amount of movement of the power pedal, to engage the lever 3 and move it against the means biasing the controller to the off position. The set screw 8 is set so that there is such a gap between it and the co-operating abutment on the lever 3 that when the power pedal is, as shown, in the off position the lever 3 is free to move clockwise to its limiting rheostatic braking position without being obstructed by the said movable abutment 8.

Freely mounted co-axially with the two pedals 2 and 6 is a brake lever 9 which is connected by the link 10 to the operating lever 11 of a valve 12 controlling the application of air brakes. The valve is biased to the braking position by a spring 14 but is held in the off position as shown when the brake pedal 2 is in the off position by the engagement of the abutment 2b of the extension 2a with an adjustable set screw 9a carried by the lever 9, the brake pedal 2 being biased to the off position by a spring 15 which is stronger than the spring 14. Initial movement of the brake pedal 2 allows the lever 9 to move and the valve to operate under the action of its biasing means to apply the air brakes; further movement of the pedal has no effect on the valve since the abutment 2b moves away from the set screw 9a. The position of the brake pedal 2 and of the parts rigidly secured to it when the full stroke of the valve has been completed and the abutment 2b has just started to recede from the set screw 9a will hereinafter be referred to as the mechanical braking position.

The push rod 1 is provided with an abutment in the form of a collar 1a which is adapted after a certain amount of lost motion to engage the pivot pin 3a and enable further movement of the rod to drive the lever 3 through all its rheostatic braking positions. The gap between the pin 3a and the collar 1a is, however, such that even after the pedal 2 and rod 1 have been moved to the mechanical braking position the lever 3 can be driven by the lever 7 through its various power positions without being obstructed by engagement between pivot pin and collar.

Fig. 2 shows the positions taken up by the levers 3 and 7 and the rod 1 when the brake pedal alone is depressed to the mechanical braking position. The collar 1a approaches nearer to the pin 3a but the lever 3 remains in the off position. Fig. 3 shows the lever 3 held in the extreme power position by the lever 7 on full depression of the power pedal. As shown, the brake pedal can still be depressed to the mechanical braking position, the collar 1a being then just in contact with the pivot pin 3a. Fig. 4 shows the lever 7 in the positions of Figs. 1 and 2, i. e., with the power pedal 6 in the off position; the brake pedal has been fully depressed and the collar 1a has come into contact with and driven pivot pin 3a whereby the lever 3 and the controller have been moved to the full rheostatic braking position, the abutment on the lever 3 being then just clear of the set screw 8.

It will be appreciated that with the arrangement illustrated and described above, it is an inherent feature of the operation that when the brake pedal is depressed the mechanical or air brakes are applied first, after which there is a certain amount of lost motion of the pedal and then rheostatic braking is applied. During the last part of the movement of the pedal the push rod 1 and the lever 3 move substantially rigidly as one piece. If, therefore, it is desired that the mechanical or air brakes should not be brought into operation until after full rheostatic braking or at some intermediate braking position, it would not be possible to achieve the fundamental object of the invention which is to allow the brake pedal to introduce the mechanical or air brakes either alone or in combination with rheostatic braking. This difficulty can be overcome by a simple modification as shown in Fig. 5 in which the collar 1a is moved back relatively to the pivot pin 3a and a coiled spring 16 is compressed between them. The action now is that when the power pedal is held in the off position by a spring 17 any depression of the brake pedal immediately causes the push rod 1 to drive the lever 3 through the collar 1a, the pivot pin 3a and the said compression spring 16. Rheostatic braking is thus at once introduced. The mechanical or air brakes may be applied at any time as described below. Should, however, the power pedal be depressed so that the set screw 8 engages the lever 3 to hold the controller in the off position or in one of its power positions, it will with this modified arrangement still be possible to apply the mechanical or air brakes by depressing the brake pedal; under such conditions the push rod 1 will slide through the pivot pin 3a on the lever 3 thereby compressing the said coiled compression spring on the rod but the controller will remain in the position in which it is held by the power pedal. The spring may be such that it normally holds the pivot pin 3a against a head provided on the outer end of the rod 1, and in this way the spring and the head may be used to bring the controller to the off position when no separate biasing of the controller will be necessary.

With the modification of the invention described in the preceding paragraph, the mechanical or air brakes may be operated by the brake pedal as shown in Fig. 1 or in any manner bringing about brake application at any point in the stroke of the brake pedal.

Quite obviously, the form of device shown is susceptible to many modifications, and it is contemplated that the invention should be limited only by the prior art and the appended claims.

We claim as our invention:

1. Means for controlling the motors and brakes of an electric vehicle comprising in combination a power pedal, a pedal for actuating a fluid pressure brake valve, a motor controller having power positions on the one side and rheostatic braking positions on the other side of an off position to which it is biased, and yielding or lost-motion-permitting driving connections between the pedals and the controller enabling the latter to be moved to its power positions by the power pedal when the brake pedal is in the off position or the position to apply the said brakes, and to be moved to its rheostatic braking positions by the brake pedal if the power pedal is not depressed.

2. Means for controlling the motors and brakes of an electric vehicle comprising in combination, a power pedal, a brake pedal, a controller-operating lever having power positions on the one side and rheostatic braking positions on the other side of an off position to which it is biased, means operable by the power pedal to drive the lever through all its power positions after an initial lost motion corresponding to the stroke of the lever in moving the controller to its extreme rheostatic braking position, and means operable by the brake pedal for driving the lever in the opposite direction but permitting sufficient movement of the brake pedal to apply the brakes if the lever be held in its extreme power position.

3. Means for controlling the motors and brakes of an electric vehicle comprising in combination, a power pedal, a pedal for actuating a fluid pressure brake valve, a controller-operating lever having power positions on the one side and rheostatic braking positions on the other side of an off position to which it is biased, a driving lever pivoted co-axially with the controller-operating lever, an adjustable abutment thereon adapted to engage and drive the controller-operating lever after relative lost motion, a rod coupling the power pedal to said driving lever, and means operable by the brake pedal for driving the lever in the opposite direction but permitting sufficient movement of the brake pedal to apply the fluid brakes if the lever be held in its extreme power position.

4. Means for controlling the motors and brakes of an electric vehicle comprising in combination, a power pedal, a brake pedal for a controller-operating lever having power positions on the one side and rheostatic braking positions on the other side of an off position to which it is biased, a driving lever pivoted co-axially with the controller-operating lever, an adjustable abutment thereon adapted to engage and drive the controller-operating lever after relative lost motion, a rod coupling the power pedal to said driving lever, a push rod connected at one end to the brake pedal and sliding freely at the other end through some part of the controller-operating lever, and means on the said push rod for driving the controller-operating lever.

5. Means for controlling the motors and brakes of an electric vehicle comprising in combination, a power pedal, a pedal for actuating a fluid pressure brake valve, a controller-operating lever having power positions on the one side and rheostatic braking positions on the other side of an off position to which it is biased, a driving lever pivoted co-axially with the controller-operating lever, an adjustable abutment thereon adapted to engage and drive the controller-operating lever after relative lost motion, a rod coupling the power pedal to said driving lever, a push rod connected at one end to the brake pedal and sliding freely at the other end through some part of the controller-operating lever, and a rigid abutment on said brake push rod adapted to drive the controller-operating lever from its off position after an initial lost motion which is the sum of the movement necessary to apply the fluid pressure brakes and the stroke of the controller-operating lever in moving the controller to its extreme power position.

6. Means for controlling the motors and brakes of an electric vehicle comprising in combination, a power pedal, a brake pedal for a controller-operating lever having power positions on the one side and rheostatic braking positions on the other side of an off position to which it is biased, a driving lever pivoted co-axially with the controller-operating lever, an adjustable abutment thereon adapted to engage and drive the controller-operating lever after relative lost motion, a rod coupling the power pedal to said driving lever, a push rod connected at one end to the brake pedal and sliding freely at the other end through some part of the controller-operating lever, and a spring compressed between an abutment on said brake push rod and the controller operating lever adapted to drive the latter when the brake pedal alone is depressed or to be compressed to permit movement of the brake pedal while the power pedal is depressed.

7. Means for controlling the motors and brakes of an electric vehicle comprising in combination, a power pedal, a pedal for actuating a fluid pressure brake valve, a motor controller having power positions on the one side and rheostatic braking positions on the other side of an off position to which it is biased, yielding or lost-motion-permitting driving connections between the pedals and the controller enabling the latter to be moved to its power positions by the power pedal when the brake pedal is in the off position or the position to apply the said brakes and to be moved to its rheostatic braking positions by the brake pedal if the power pedal is not depressed, a fluid pressure-valve operating lever pivoted co-axially with the pedals, and a lever adapted to be moved by the brake pedal out of the way of said brake operating lever to permit it to move to a brake operating position.

8. Means for controlling the motors and brakes of an electric vehicle comprising in combination, a power pedal, a pedal for actuating a fluid pressure brake valve, a motor controller having power positions on the one side and rheostatic braking positions on the other side of an off position to which it is biased, yielding or lost-motion-permitting driving connections between the pedals and the controller enabling the latter to be moved to its power positions by the power pedal when the brake pedal is in the off position or the position to apply the said brakes and to be moved to its rheostatic braking positions by the brake pedal if the power pedal is not depressed, and spring means for biasing said pedals to their off positions.

PAUL L. MARDIS.
FREDERICK WILSON.
CHARLES J. CALDBECK.